Jan. 5, 1965      J. V. MILLER      3,164,750
ELECTRONIC PACKAGING APPARATUS
Filed July 30, 1962      4 Sheets-Sheet 1
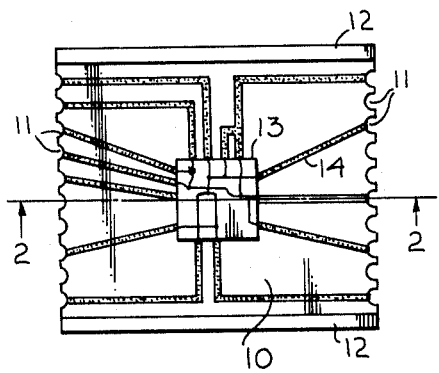
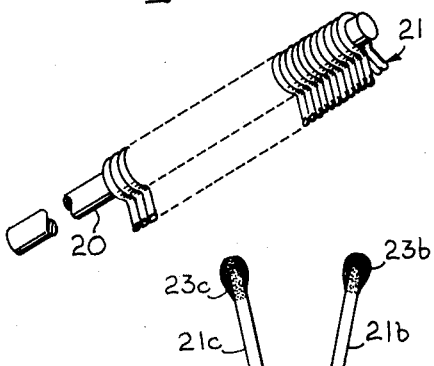
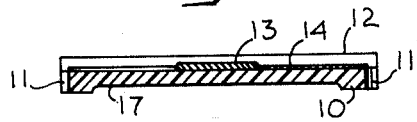
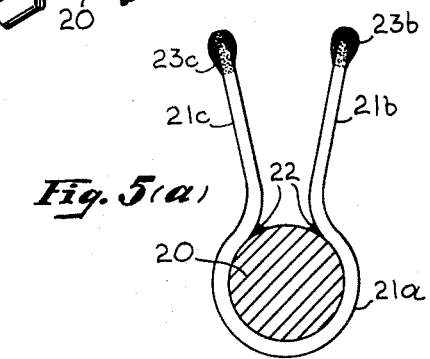
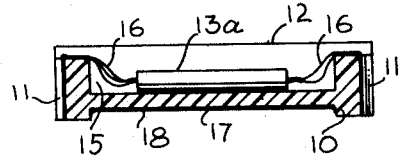
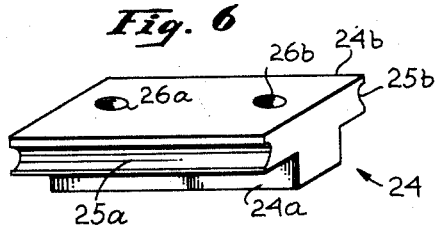
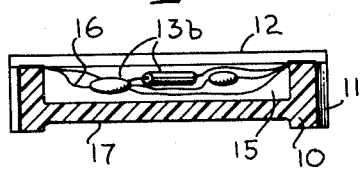
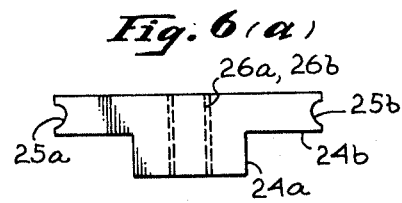
JACK V. MILLER
INVENTOR.
BY Allen E. Botney
ATTORNEY

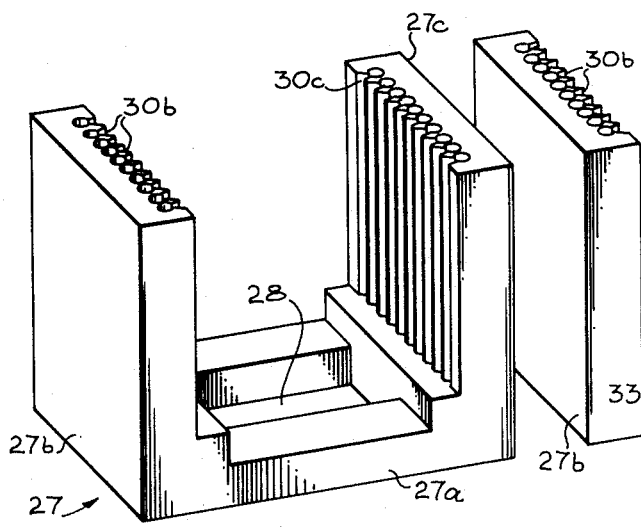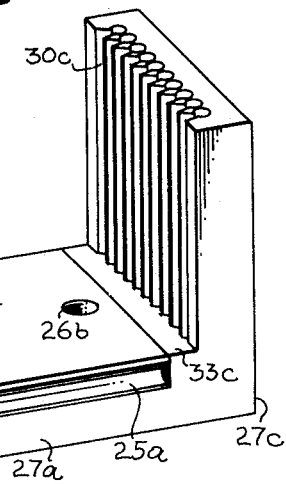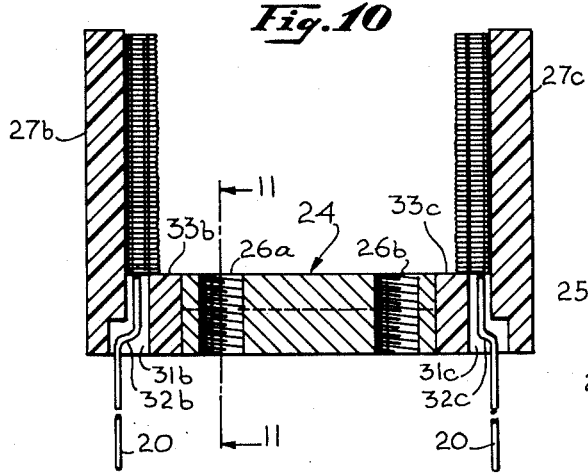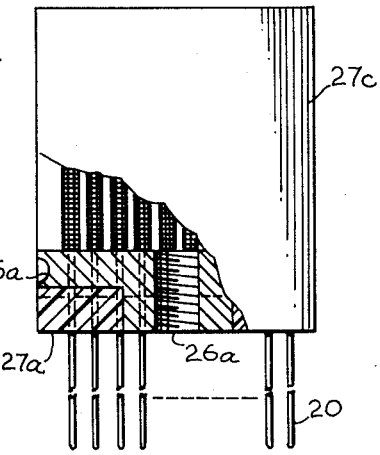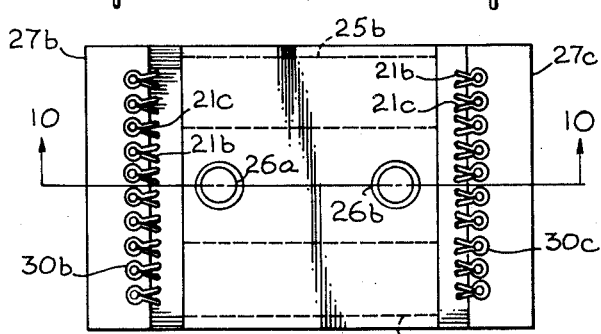

Jan. 5, 1965 J. V. MILLER 3,164,750
ELECTRONIC PACKAGING APPARATUS
Filed July 30, 1962 4 Sheets-Sheet 3

JACK V. MILLER
INVENTOR.
BY Allen F. Botney
ATTORNEY

Jan. 5, 1965 J. V. MILLER 3,164,750
ELECTRONIC PACKAGING APPARATUS
Filed July 30, 1962 4 Sheets-Sheet 4

JACK V. MILLER
INVENTOR.

BY *Allen E. Botney*

ATTORNEY

United States Patent Office 3,164,750
Patented Jan. 5, 1965

3,164,750
ELECTRONIC PACKAGING APPARATUS
Jack V. Miller, Azusa, Calif., assignor to Electro-Optical
Systems Inc., Pasadena, Calif.
Filed July 30, 1962, Ser. No. 213,450
13 Claims. (Cl. 317—101)

The present invention relates in general to the art of packaging electronic components and more particularly relates to a system for the interconnection of substrate mounted circuit elements that will permit the easy assembly and replacement of these circuit elements.

In many forms of circuit structures, the circuit components or even entire circuits are mounted on a plurality of boards or wafers and somehow these components and circuits must be interconnected to provide an electrically operative system. While printed circuit techniques have generally been employed for the interconnections on an individual wafer, the interconnections between wafers, which are placed, for instance, face-to-face or back-to-back and substantially in parallel with one another, have in the past necessitated a rather expensive and laborious procedure that included the individual soldering of many thousands of connecting wires between the boards or, in the alternative, the individual wiring of such connectors in combination with a dip-soldering technique. Thus, the techniques used heretofore have caused the resultant circuits to be relatively expensive, due to the considerable time required for the actual wiring of the over-all circuit. In addition, the connection techniques employed have resulted in final circuit configurations wherein individual circuit wafers are relatively difficult to install or remove, and wherein relatively large spacing is required between individual connectors. Thus, one of the major reasons for the reluctance of electronics equipment designers to utilize circuits that are constructed as monolithic blocks is that the designer very substantially loses the ability to control the components which go into his end product. For instance, if he wishes to change the value of a feedback resistor in a functional block amplifier, he must wait for the component manufacturer to supply a new amplifier having the altered resistor value. Even this course of action is rather idealized for in most cases the user of a device comprised entirely of functional elements cannot replace a circuit wafer within the device. The functional elements that are available at present are so difficult to interconnect that only the most skilled technician, using highly specialized equipment, can extract and replace a wafer within an assembly. This very often means to the user that the component manufacturer must service as well as manufacture the assembly of functional elements. In short, the presently available functional circuits are not being designed with their end use in mind. These devices are viewed as components by the user and any component that cannot be readily replaced or readily connected to other similar or different components is virtually worthless to him.

The present invention serves to obviate these known difficulties and does so by providing or making available simple, reliable interconnection apparatus that can be combined with established functional block practice to form practical and maintainable electronic assemblies. The essence of the invention resides in a novel receptacle into which the several circuit boards or wafers constituting the abovesaid functional blocks are slideably inserted, electrical connection between the electrical components on the various circuit boards and to external circuitry being achieved by means of the receptacle itself. Just as the boards are slideably inserted in the receptacle, they are also slideably removable, thereby providing easy access to them for replacement or servicing. Thus, the present invention makes possible the replacement of a circuit substrate by a reasonably skilled technician who is equipped with only very simple tools. This ease of assembly and maintenance produces the further benefits of reducing costs in the manufacture of these circuit structures and also of reducing the time required for their manufacture, thereby making it possible to meet relatively short or "tight" manufacturing schedules.

It is, therefore, an object of the present invention to provide for the easy interconnection of electrical components mounted on circuit boards.

It is another object of the present invention to provide for the easy assembly and maintenance of circuit boards on which various interconnected electrical components are mounted.

It is a further object of the present invention to provide a simple way for electrically connecting a plurality of circuit boards to each other as well as to external circuitry.

It is an additional object of the present invention to reduce the costs and time required in the manufacture and maintenance of electronic circuit packaging arrangements.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURE 1 is a top view of one kind of circuit wafer according to the present invention;

FIGURE 2 is a cross-sectional view of the structure in FIG. 1 taken along the lines 2—2;

FIGURES 3 and 4 are cross-sectional views of the circuit wafer shown in FIG. 1 after it has been modified to accommodate specific kinds of electronic components;

FIGURE 5 illustrates one of the elements going into the construction of the receptacle for the circuit wafers shown in FIGS. 1 through 4;

FIGURE 5a is an end view of the element illustrated in FIG. 5;

FIGURE 6 illustrates another element incorporated in the aforesaid receptacle structure;

Figures 12, 13A, 13B:
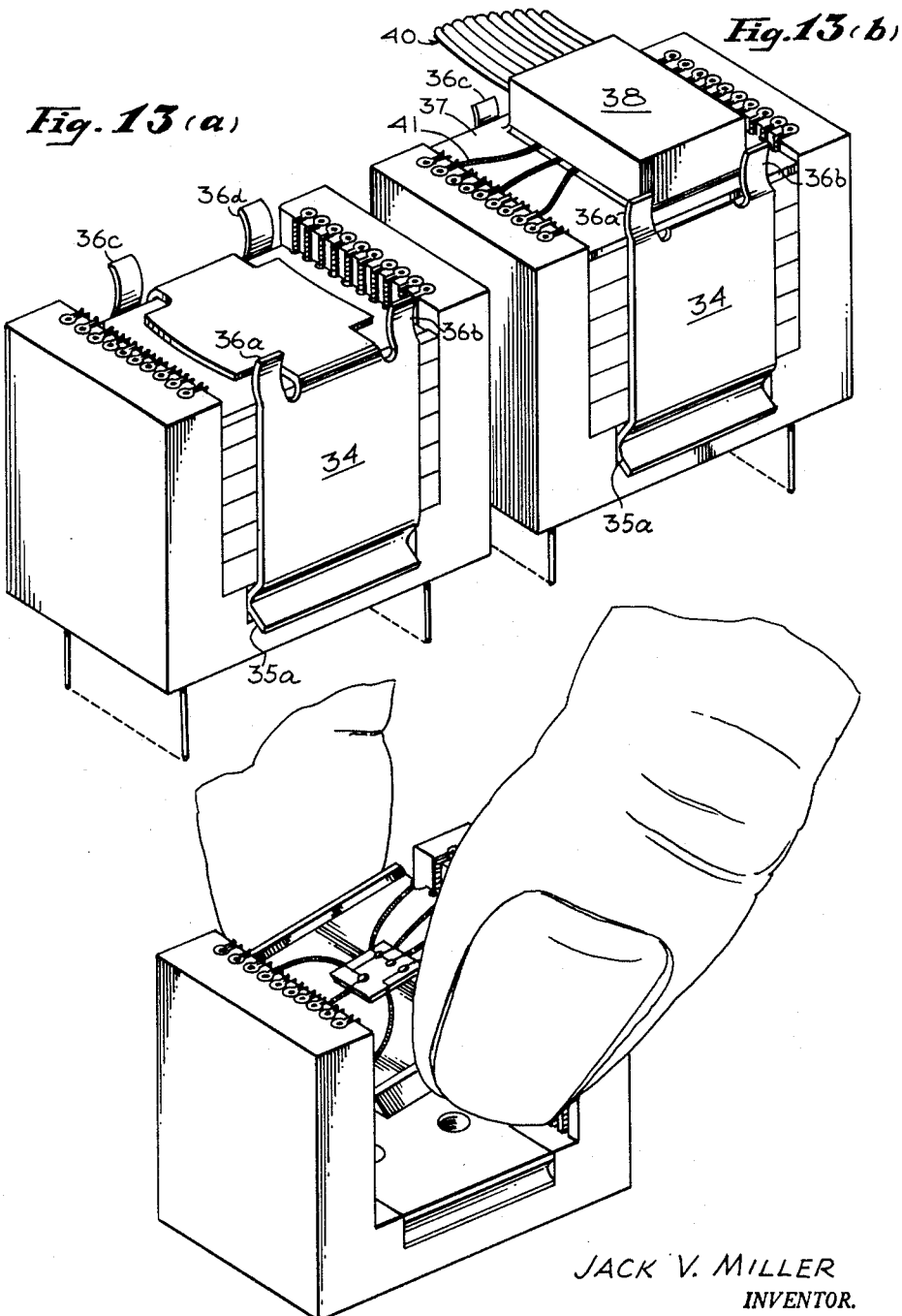
Figure 14:
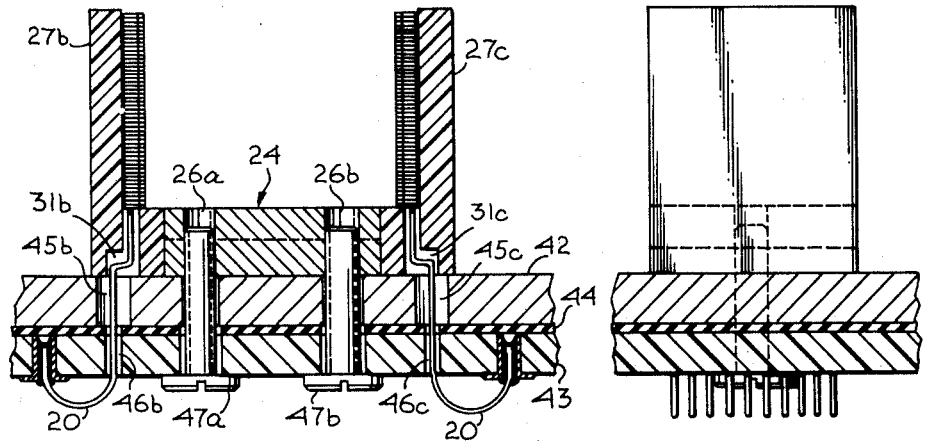
Figure 15:
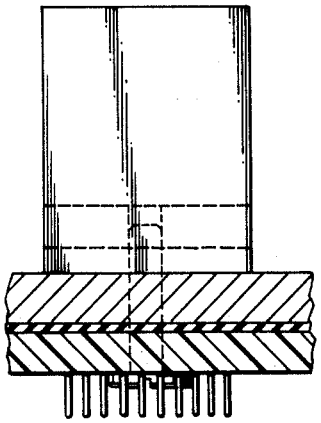
Figure 16:
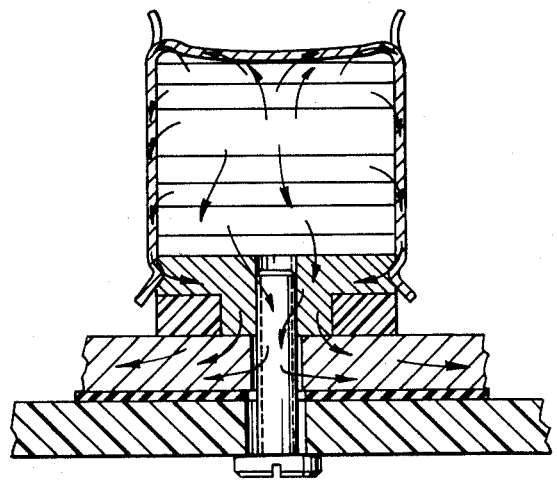

FIGURE 6a presents an end view of the element in FIG. 6;

FIGURE 7 illustrates the base structure of the receptacle into which the elements of FIGS. 5 and 6 are mounted;

FIGURE 8 is an isometric view of the complete receptacle structure;

FIGURE 9 is a top view of the receptacle structure shown in FIG. 8;

FIGURE 10 is a cross-sectional view of the receptacle taken along the lines 10—10 in FIG. 9;

FIGURE 11 is an end view, partially cut away, of the receptacle shown in FIG. 8;

FIGURE 12 shows a complete receptacle and circuit wafer and illustrates the manner in which the circuit wafer is inserted into the receptacle;

FIGURES 13a and 13b illustrate complete packaging assemblies in accordance with the present invention;

FIGURE 14 is a cross-sectional view depicting the manner in which the aforesaid receptacle may be mechanically and electrically coupled to a printed circuit board and the circuitry thereon;

FIGURE 15 is an end view, partially in cross-section, of the arrangement shown in FIG. 14;

FIGURE 16 is an end view, in cross-section, of a complete packaging assembly as it is mounted on a circuit board and shows the manner in which the circuit wafers are stacked in the receptacle as well as the heat-flow paths through the assembly.

Referring now to the drawings, a substrate circuit wafer 10 made of an electrically insulative material and having a rectangular shape is illustrated in FIGS. 1 and 2. Circuit wafer 10 has equal numbers of semi-circular recesses or slots 11 along the edges of its shorter sides which give these two opposite borders a serpentine or corrugated appearance. Along the edges of its two longer dimensions, the circuit wafer includes support flanges 12 which extend vertically upward from the base for a short distance, the purpose of these flanges being to provide a slight spacing between circuit wafers when they are stacked one upon the other, as will be seen later.

Mounted centrally on the circuit wafer base is one or more microelectronic circuit arrangements 13, the individual circuit elements thereof being electrically connected to selected ones of slots 11 by means of very thin and very narrow strips of metal, such as copper, that have in some manner been deposited on the circuit wafer base. In this respect, standard printed circuit techniques may be utilized to form conductive paths 14. In order to make electrical contact between the elements of circuit arrangement 13 and those on other circuit wafers or to external circuitry, selected faces of slots 11 are conductively plated and this may be done at the same time that conductive paths 14 are formed and by the same method. Circuit wafer 10 is quite small and thin and although many variations in size are possible, typical dimensions for a circuit wafer of the kind being described may be 0.500 inch x 0.375 inch x 0.020 inch.

To accommodate other types of circuit components, the circuit wafer may be modified in the manner shown in FIGS. 3 and 4. Thus, where circuit components have a certain amount of thickness because of which these components may protrude above support flanges 12 in FIG. 1, the thickness of the circuit wafer is increased to provide a cavity 15 in which the circuit components may be placed. The configuration and relative size of cavity 15 into which the sub-miniature components or other purchased circuit elements may be inserted, such as those designated 13a and 13b, are clearly shown in FIGS. 3 and 4, connection between these components or elements and slots 11 being effected by means of the leads, designated 16, associated with these components or elements.

It will be noticed from the cross-sectional views in FIGS. 2, 3 and 4 that the bottom surface of wafer 10 is recessed slightly as at 17. Since, as has already been mentioned, circuit wafers 10 are stacked one above the other in some close proximity to each other, there may be some undesirable interactions between the various circuit arrangements. Accordingly, recess 17 is included in the wafer configuration in order to make it possible to add shielding material to a wafer to electrically isolate or shield it from the circuit wafer next below it. A shielding foil 18 mounted in recess 17 is shown in FIG. 3.

The receptacle that houses the circuit wafers and the component parts of the receptacle are illustrated in FIGS. 5 through 8. The component part in FIGS. 5 and 5(a) is shown to include a lead-in-wire 20 and plurality of contact wires 21 mounted on the lead-in-wire along a substantial portion of its length. Contact wires 21 are generally U-shaped in their configuration with the arms of the U diverging at a slight angle or, stated differently, extending outwardly with respect to each other. The bottom or base portion of contact wire 21 is designated 21a in FIG. 5(a), while the arms of the contact wire are respectively designated 21b and 21c. Contact wire 21 is mounted on lead-in-wire 20 by sliding the lead-in-wire through the circular opening formed by bottom portion 21a, the fit between the two being snug in order to provide mechanical rigidity and good electrical contact. For these purposes also, the abovesaid bottom portion of the contact wire is welded to the lead-in-wire and the extreme points of juncture 22 between them are plated, as shown in the figure. The very ends or tips of arms 21b and 21c are also plated to form nodules 23b and 23c, these nodules being employed to provide and maintain good electrical contact and mechanical firmness with slots 11 of circuit wafers 10. In mounting the contact wires, they are stacked one above the other so that each contact wire abuts against its neighboring contact wires and, furthermore, they are all aligned or in registration with each other to form a neat row. By way of example, lead-in-wire 20 may have a diameter of 0.012 inch and contact wire 21 may have a thickness of 0.001 inch and an overall height of 0.030 inch.

Another component part of the circuit wafer receptacle is a T-shaped metallic block 24 shown in FIGS. 6 and 6(a), the metal from which the block is made preferably being a light metal, such as aluminum. The lower portion of block 24 is designated 24a and the upper portion thereof is designated 24b, the extremities or sides of portion 24b being curved inwardly to form a pair of concavely arced recesses 25a and 25b by means of which a locking clip is held in place, as will be described later. Along a center line of upper portion 24b are a pair of threaded holes 26a and 26b which extend downward from portion 24b and through lower portion 24a. A side view of block 24 clearly showing the contours of curved portions 25a and 25b, as well as the threaded holes, is clearly shown in FIG. 6(a).

The housing structure of the circuit wafer receptacle, generally designated 27, is shown in FIG. 7 and, as shown therein, resembles the letter U of the alphabet. The base of structure 27 is designated 27a and its two upright walls are designated 27b and 27c, respectively. Base 27a has a U-shaped cavity for the purpose of receiving T-shaped block 24 previously described in connection with FIG. 6 and, therefore, as may be expected, the dimensions of this cavity, which is designated 28, are substantially those of the block. Thus, as will be seen later, metal block 24 completely fills cavity 28, that is to say, when block 24 is inserted in cavity 28, the surfaces of the block are flush with the surfaces of base 27a. With respect to walls 27b and 27c, in a row along the sides facing each other and for the full height of these walls are a plurality of slots designed to receive the receptacle components described in connection with FIG. 5, namely, the lead-in and contact wires. More particularly, the slots, which are respectively designated 30b and 30c, have the general configuration and dimensions of the component as it is shown in FIG. 5(a) but are adapted to permit elements 21b and 21c of the contact wires to protrude from them.

The complete assembly of the receptacle components is shown in detail in FIGS. 8 through 11, the several figures mentioned clearly showing the mounting of block 24 in cavity 28 as well as the stacking of contact wires 21 in slots 30b and 30c. Thus, for example, FIG. 9 clearly shows the configuration of the slots and the extent to which contact elements 21b and 21c protrude from them. Also shown in FIG. 10 is the fact that walls 27b and 27c respectively include L-shaped openings 31b and 31c. These openings extend for substantially the full width of walls 27b and 27c and connect with slots 30b and 30c. It will further be noted from FIG. 10 that lead-in wires 20 are crimped, as at 32b and 32c, to follow the configuration of openings 31b and 31c. Thus, by crimping them in this manner, wires 20 and, therefore, contact members 21 are thereby prevented from moving upwards. Lead-in-wires 20 and contact members 21 mounted thereon are also prevented from moving downwards, this being achieved by the fact that elements 21b and 21c of the bottommost contact wires 21 rest on either shoulder 33b and 33c of the receptacle base 27a. Consequently, by means of openings 31b and 31c, crimpings 32b and 32c, and shoulders 33b and 33c, the various stacks of contact members 21 are firmly held in position in their respective slots.

Having thus described the construction of both the circuit wafers and the receptacle for the circuit wafers, reference is now made to FIG. 12 wherein is shown the manner in which a circuit wafer is inserted in the receptacle. In this regard, it should be noted from the figure that the assembly of the substrate mounted circuits in the receptacle support is entirely mechanical in that the substrate mounted circuits or, as it has been previously referred to herein, the circuit wafers, need only be inserted in the receptacle in what may be termed as a "plug-in" manner. Once this is done, the metallic coatings on the faces of slots 11 of circuit wafers 10 come into electrical contact with nodules 23b and 23c of contact members 21 in slots 30b and 30c, with the result that electrical connection is completed to the circuit components mounted upon the wafers. It will be recognized that in accordance with the present invention, the substrate circuit wafers may be installed in the receptacle either before or after the receptacle is mounted onto some other surface, such as the surface of a metal chassis. This means that the user has the option of preassemblying a complete subsystem and then installing it if he so wishes.

Once all the substrate members have been plugged in, they may be rigidly fixed in position on the receptacle by means of a locking clip 34 which fits over the entire group of wafers and couples to metal block 24, as is shown in FIG. 13(a). Clip 34 is generally U-shaped and has a pair of lips 35a and 35b at its extremities that respectively snap into grooves 25a and 25b of metal block 24. Extending away from the base of clip 34 are several pronged elements 36a–36d that are arced slightly to provide a spring action therebetween. The reason for elements 36a–36d may be seen from FIG. 13(b) wherein one final wafer 37 is shown inserted in receptacle 27 and resting on the base of clip 34. It will also be seen from FIG. 13(b) that wafer 37 is positioned between pronged elements 36a–36d and that the spring-action of these elements combine to firmly hold this wafer in place. Wafer 37 is provided with test apparatus 38 from which test leads 40 extend for connection to external test equipment (not shown).

Thus, referring again to FIG. 13(a), locking clip 34, when installed over a stack of circuit wafers does not come up to the full height of receptacle 27 and since contacts 21 do extend to the full height of the receptacle, the completed assembly has the appearance of having the topmost wafer missing. It is this open slot that is specifically planned for the insertion of test wafer 37 as is shown in FIG. 13(b) or without the test wafer in place, the contacts 21 are accessible to test probes, ears 36a–36d extending upwards from the locking clip having the function of engaging the test wafer with sufficient force to prevent accidental removal. It will be recognized that test apparatus 38 is electrically coupled to the various circuits on the circuit wafer stack in the same manner as previously described, namely, by conductive paths on both wafer 37 and the other wafers in the stack, by contact wires 21, and by conductively plated slots 11.

Wafer receptacle 27 is suited for mounting on various surfaces and, although the fastening method described herein is limited to screw mounting, the receptacle nevertheless offers several options to the user in the way of fastening techniques. In this example, as is shown in FIGS. 14, 15 and 16, receptacle 27 is shown mounted to a conventional circuit board-chassis configuration, the metal chassis being designated 42, the printed circuit board being designated 43, and a layer of insulation between the chassis and the board being designated 44. It should be noted that the receptacle is shown mounted in contact with the metal chassis and not the circuit board, lead wires 20 feeding through two openings in the chassis, designated 45b and 45c, and then passing through insulation layer 44 and circuit board 43 through which corresponding openings 46b and 46c have been made. Thus, receptacle openings 31b and 31c, chassis openings 45b and 45c, and insulation and circuit board openings 46b and 46c are respectively in alignment.

Lead wires 20 protruding through the bottom of board 43 may be soldered directly to a conductor pattern on the board, may be soldered or welded directly to the lead wires of other wafer assemblies of the present invention and/or other components, or the leads may be clipped and ribbon conductors attached thereto in the form of a matrix. An illustrative connection of wires 20 to the elements of printed circuit board 43 is shown in FIG. 14. Mounting of the receptacle to the chassis-board arrangement is achieved by means of a pair of screws 47a and 47b which extend through the board and the chassis and into holes 26a and 26b of metal block 24. Screws 47a and 47b not only help in the mounting of the receptacle but, as will subsequently be seen, also provided thermal-flow paths from the receptacle to the chassis.

Several features of the present invention have important bearing on the heat removal process. Accordingly, reference is now made to FIG. 16 wherein is illustrated the heat-flow paths through a packaging assembly constructed in accordance with the present invention. In connection with heat flow, metal block 24 in the bottom of receptacle 27 is made of metal, such as anodized aluminum, as previously mentioned. This block is in direct contact with both the bottommost circuit wafer in the stack as well as the chassis on which the receptacle is mounted. Consequently, heat generated by the electronic components mounted on the several circuit wafers find an escape route through this metal insert to the chassis. Furthermore, in addition to the heat flow into the chassis from the lower surface of the insert, mounting screws 47a and 47b themselves offer an excellent thermal path.

Considering the subject of heat flow still further, when locking clip 34 is installed, thermal contact is established with the top circuit wafer in the stack as well as with the edge surface of every circuit wafer in the receptacle. Since the locking clip snaps into grooves 25a and 25b in metal block 24, the heat generated throughout the stack has a direct path to the chassis without passing through an adjacent wafer. However, as may be expected, heat paths through the stack do exist somewhat since the entire stack is always in compression. The several heat-flow paths are illustrated in FIG. 16 by means of the arrows shown therein. Finally, it will be remembered that the central areas of the circuit wafers are relieved slightly to provide thermal-contact areas without obstructions, which brings the entire stack much closer to an isothermal condition.

Although a few variations or modifications have been taught, only one particular arrangement of the invention has been illustrated above by way of example. It is not intended, however, that the invention be limited thereto. Accordingly, the invention should be considered to include any and all modifications, alterations or equivalent arrangements falling within the scope of the annexed claims.

Having thus described the invention, what is claimed is:

1. Apparatus for receiving circuit wafers, said apparatus comprising:
   (a) U-shaped structure having slots facing each other along the inner surfaces of its walls and a U-shaped cavity in its base between the walls;
   (b) A T-shaped metal block mounted in said cavity, said block respectively having a pair of grooves in the sides thereof facing outwardly of said U-shaped structure;
   (c) and conductive members equal in number to the number of wafers that may be received by the apparatus mounted one above the other in said slots and adapted to make electrical contact with the circuit wafers therebetween.

2. The apparatus defined in claim 1 wherein said apparatus further includes a U-shaped clip that fits over the wafers, said clip being adapted at its extreme ends to snap into said grooves, thereby firmly holding the wafers in position.

3. The apparatus defined in claim 1 wherein each of said conductive members is generally U-shaped and plated at its tips to form metal nodules that slidably contact the circuit wafers.

4. A receptacle for electrically interconnecting a stack of circuit wafers housed therein, said receptacle comprising:
 (a) A U-shaped structure having two rows of slots facing each other along the inner surfaces of its walls and for the full height thereof, the base of said structure having grooves along the sides thereof facing outwardly of said structure;
 (b) A wire rod mounted in each of said slots to form two rows of rods facing each other;
 (c) and a plurality of elements mounted one above the other on each of said rods for electrically interconnecting the wafers, said elements being adapted to slidably contact the wafers.

5. The receptacle defined in claim 4 wherein each of said elements is generally U-shaped, the arms thereof diverging at a slight angle and plated at their tips to form nodules for slidably contacting the wafers.

6. The apparatus defined in claim 4 wherein said receptacle further includes a U-shaped clip that fits over the wafers, said clip being adapted at its ends to snap into said grooves, thereby firmly holding the wafers in position.

7. A receptacle for electrically interconnecting a stack of circuit wafers housed therein, said receptacle comprising:
 (a) A U-shaped structure having two rows of slots facing each other along the inner surfaces of its walls and for the full height thereof, the base of said structure having grooves along the sides thereof facing outwardly of said structure;
 (b) A wire rod mounted in each of said slots to form two rows of rods facing each other;
 (c) A plurality of elements mounted one above the other on each of said rods for electrically interconnecting wafers, each of said elements being U-shaped, the arms thereof diverging at a slight angle and plated at their tips to form nodules for slidably contacting the wafers;
 (d) and a U-shaped clip that fits over the wafers, said clip being adapted at its end to snap into said grooves, thereby firmly holding the wafers in place.

8. Electronic packaging apparatus comprising:
 (a) A plurality of boards in a stack one upon the other, each of said boards comprising a layer of non-conductive material having an electrical circuit thereon, and a plurality of slots in opposite edges of said boards, each of said slots having a conductive material on the inner walls thereof;
 (b) and a receptacle for electrically interconnecting the circuits on said boards, said receptacle including a U-shaped structure having two rows of slots facing each other along the inner surfaces of its walls and for the full height thereof, the base of said structure having grooves along the sides thereof facing outwardly of said structure, a wire rod mounted in each of the slots in said walls, to form two rows of rods facing each other, and a plurality of conductive elements mounted one above the other on each of said rods for electrically interconnecting said boards, said elements being adapted to slidably contact the conductive material on the inner walls of the slots in said boards;
 (c) and a U-shaped clip that fits over said boards, said clip being adapted at its ends to snap into said grooves, thereby firmly holding said boards in position.

9. The apparatus defined in claim 8 wherein each of said elements is generally U-shaped, the arms thereof diverging at a slight angle and plated at their tips to form nodules that slidably contact said conductive material on the inner walls of the slots in said boards.

10. Electronic apparatus for electrically interconnecting a stack of circuit wafers housed thereon, said apparatus comprising:
 (a) A U-shaped structure having two rows of slots facing each other along the inner surfaces of its walls and for the full height thereof;
 (b) A wire rod mounted in each of said slots to form two rows of rods facing each other, said rods being long enough to protrude for a predetermined length through the bottom of said structure;
 (c) A plurality of elements mounted one above the other on each of said rods for electrically interconnecting the wafers, said elements being adapted to slidably contact the wafers;
 (d) A sandwich arrangement of a metal chassis, a printed circuit board, and a layer of insulative material therebetween said sandwich arrangement having openings therethrough in alignment with said slots and through which said wire rods respectively extend for connection to the circuitry on said printed circuit board.

11. The apparatus defined in claim 10 wherein each of said elements is generally U-shaped, the arms thereof diverging at a slight angle and plated at their tips to form nodules that slidably contact the circuit wafers.

12. Electronic apparatus for electrically interconnecting a stack of circuit wafers housed thereon, said apparatus comprising:
 (a) A U-shaped structure having two rows of slots facing each other along the inner surfaces of its walls and a U-shaped cavity in its base between the walls;
 (b) A T-shaped metal block mounted in said cavity, said block respectively having a pair of grooves in the sides thereof facing outwardly of said structure;
 (c) A resilient conductor mounted in each of said slots to form two rows of rods facing each other, said rods being long enough to protrude for a predetermined length through the bottom of said structure;
 (d) A plurality of elements mounted one above the other on each of said rods for electrically interconnecting the wafers, each of said elements being generally U-shaped with the arms thereof diverging at a slight angle and plated at their tips to form nodules that slidably contact the circuit wafers;
 (e) and a sandwich arrangement of a metal chassis, a printed circuit board, and a layer of insulative material therebetween, said structure being mounted on said sandwich arrangement so that said metal block is in contact with said metal chassis, said sandwich arrangement having openings therethrough in alignment with said slots and through which said wire rods respectively extend for connection to the circuitry on said printed circuit board.

13. The apparatus defined in claim 12 wherein said apparatus further includes a U-shaped clip that fits over the wafers, said clip being adapted at its ends to snap into said grooves, thereby firmly holding the wafers in position and providing a heat path from the wafers to said metal block and chassis.

References Cited by the Examiner
UNITED STATES PATENTS

| | | | |
|---|---|---|---|
| 2,881,364 | 4/59 | Demer et al. | 317—100 |
| 2,926,340 | 2/60 | Blain et al. | 339—17 |
| 2,944,121 | 7/60 | Wasylenko | 339—17 |
| 3,059,153 | 10/62 | Shaffer | 317—101 |

FOREIGN PATENTS 866,528  5/61  Great Britain.

JOHN F. BURNS, *Primary Examiner*.